June 2, 1931. P. W. LEHMAN 1,807,664
APPARATUS FOR REMOVING TRIMMED WASTE FROM RUBBER TUBES
Filed March 25, 1929

INVENTOR.
PAUL W. LEHMAN
BY
Robert T. Harvey
ATTORNEY.

Patented June 2, 1931

1,807,664

UNITED STATES PATENT OFFICE

PAUL W. LEHMAN, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS

APPARATUS FOR REMOVING TRIMMED WASTE FROM RUBBER TUBES

Application filed March 25, 1929. Serial No. 349,568.

This invention relates to an apparatus for trimming rubber tubes to length while they are on the mandrel and for removing the waste therefrom. It has for its object the cutting of the tube and the removal of the trimmed waste without the necessity for any manual operation, the entire work of cutting and of removing the trimmed rubber being done by automatically operating devices.

Referring to the drawings which illustrate one embodiment of my invention,

Figure 1:
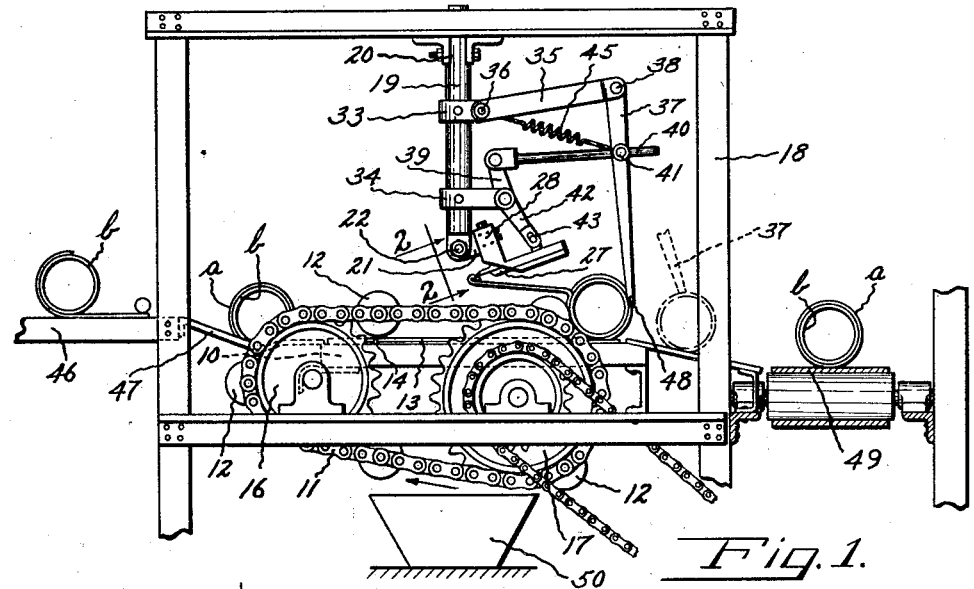
Fig. 1 is a side view of an apparatus made in accordance to my invention shown located between a rolling table and a conveyor.

Tubes $a$ are supplied upon mandrel $b$ and are carried over an electrically heated cutter 10 long enough to make a cut completely around the rubber tube $a$. Chain 11 having roller pushing members 12 at intervals therealong and driven with a constant motion in the direction of the arrow in Fig. 1 is used to carry the mandrels over the heated cutter. The chain 11 may be driven by any suitable source of power which it is not necessary to illustrate.

The cutter consists of two knives, one a circumferential knife 13 and the other a longitudinal knife 14, the latter making a cut 15 from the circumferential cut on the tube to the end of the tube. The cutter will not be described in detail as it forms the subject of application of George J. Mead, Serial No. 69,125 filed November 4, 1925.

Figures 4, 5:
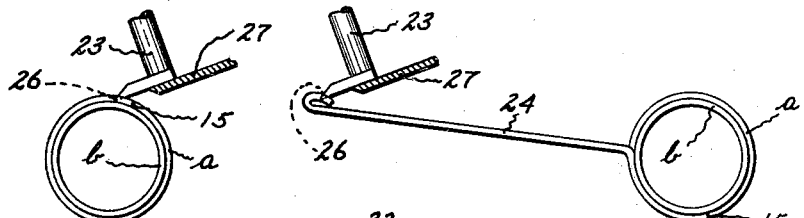
Fig. 4 is a detail view showing the plows digging into the rubber waste on the tube.
Fig. 5 is a detail view showing the rubber waste being drawn from the tube as the mandrel is carried away from the plows.

Sprockets 16 and 17 over which the chain 11 is carried may be supported in a frame 18, this frame also carrying the waste removing apparatus. This apparatus consists of a supporting bar 19 secured in any suitable manner to the frame as at 20 and having pivoted at its lower end a holder 21 held in adjusted position by a lock nut 22. A series of sharpened plows 23 adapted to stick into the waste stock 24 on the mandrel are adjustably held in place in the holders 21 by set screws 25. By means of the two adjustments, locknut 22 and set screws 25, the plows may be regulated to strip the waste stock of various sizes of mandrels. The plows are set so that their points 26 will dig into the stock 24 a short distance behind the longitudinal cut 15 (Fig. 4). The stock 24 will then be gradually drawn off the mandrel as it is carried along by the pushing members 12 (Fig. 5).

In order to remove the waste stock 24 from the plows 23 I have provided a stripper 27 fitting directly beneath the plows and adapted to push the stock from them. This stripper is slidably held in place under the plows by side plates 28 fixed to the holder 21 and by ways formed by plates 29 and 30 secured to side plates 28. An eye-screw 31 is fitted to the stripper 27 and extends through an elongated slot 32 in the plate 29 so that by moving the eye-screw 31 the slide may be moved back or forth under plows.

Figures 2, 3:
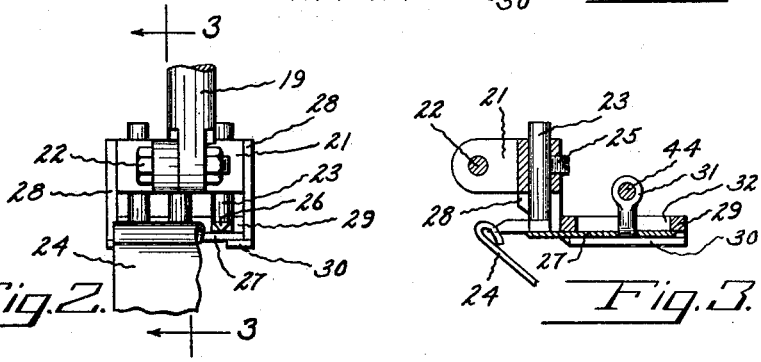
Fig. 2 is an enlarged view taken substantially on line 2—2 of Fig. 1.
Fig. 3 is a view taken substantially on line 3—3 of Fig. 2.

This movement is produced by a system of levers set into operation by the stripped mandrel as it passes from the heated cutters. The levers are supported from brackets 33 and 34 fixed to the bar 19. An arm 35 is clamped in desired position on the bracket 33 by a lock-nut 36 and a lever 37 is, in turn, hinged to the arm 35 at 38. The bracket 34 is provided with a bell-crank, one arm 39 of which is hinged to a rod 40 that fits into a trunnion 41 carried by the lever 37. The other arm 42 of the bell-crank is provided with an elongated slot 43 adapted to fit over a pin 44 carried by the eye-screw 31. A light tension spring 45 between the lock-nut 36 and the trunnion 41 ordinarily tends to keep the stripper in the position shown in Fig. 3.

The operation of the apparatus is as follows. Mandrels *b* provided with tubes *a* are delivered to the apparatus as from a rolling table 46 as shown and are rolled down the guides 47. The pushing members 12 carry the mandrels over the heated cutters 10 where the rubber tube is cut at a predetermined location. As the mandrels are carried along the cutters the plows 23 will pierce the waste stock 24 so that the innermost plow will fit just outside the circumferential cut and behind the longitudinal cut.

Figure 7:
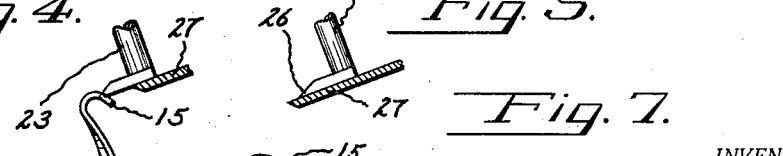
Fig. 7 is a detail view showing the stripper moved past the face of the plows thereby stripping off the rubber waste hooked by the plows.
Figure 6:
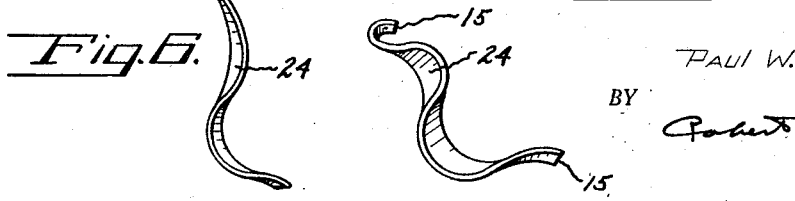
Fig. 6 is a detail view showing the stripped rubber waste hanging from the plows.

The mandrels will continue to move on along the cutters 10, due to the propelling members, and upon striking the lever 37 will gradually push this lever to the right, as shown in Fig. 1, against the action of the spring 45. Due to the linkage the stripper will be moved under the plows, as shown in Fig. 7, and will push off the waste. After the end 48 of the link 37 rides over the mandrel the spring 45 will draw it, as well as the stripper 27, back into inoperative position.

After being trimmed the mandrels may, if desired, be carried off as on a conveyor 49. A pan 50 may also be provided to catch the waste stock 24 as it is pushed off by the stripper.

Having thus described my invention, I claim:

1. In a rubber tube trimming device which includes a conveyor for tube mandrels and means for circumferentially trimming the end of the tube and cutting the waste portion longitudinally from the circumferential cut to the end of the tube, means for removing the waste portion from the mandrel which comprises means positioned to dig into and hold the waste portion of the tube as it is conveyed past the said means and means to strip the waste portion from the holding means after complete removal of the waste from the mandrel.

2. In a rubber tube trimming device which includes a conveyor for tube mandrels and means for circumferentially trimming the end of the tube and cutting the waste portion longitudinally from the circumferential cut to the end of the tube, means for removing the waste portion from the mandrel which comprises a series of prongs positioned to dig into and hold the waste portion of the tube as it is conveyed past the prongs and means to strip the waste portion from the prongs after complete removal of the waste from the mandrel.

3. In a rubber tube trimming device which includes a conveyor for tube mandrels and means for circumferentially trimming the end of the tube and cutting the waste portion longitudinally from the circumferential cut to the end of the tube, means for removing the waste portion from the mandrel which comprises a plurality of plows adapted to engage with and retain the waste as the tube is conveyed past the plows, and a stripper slidably held adjacent the plows and adapted to push the waste from the plows.

4. In a rubber tube trimming device which includes a conveyor for tube mandrels and means for circumferentially trimming the end of the tube and cutting the waste portion longitudinally from the circumferential cut to the end of the tube, means for removing the waste portion from the mandrel which comprises a plow for engaging the waste, a stripper slidably held adjacent the plow remote from the waste engaging portion of the plow, means for sliding the stripper past the engaging portion of the plow, and means for returning the stripper to its remote position.

5. In a rubber tube trimming device which includes a conveyor for tube mandrels and means for circumferentially trimming the end of the tube and cutting the waste portion longitudinally from the circumferential cut to the end of the tube, means for removing the waste portion from the mandrel which comprises a plow for engaging the waste, a stripper slidably held adjacent the plow, and means actuated by the mandrel after the latter has been freed of the waste for sliding the stripper past the plow.

6. In a rubber tube trimming device which includes a conveyor for tube mandrels and means for circumferentially trimming the end of the tube and cutting the waste portion longitudinally from the circumferential cut to the end of the tube, means for removing the waste portion from the mandrel which comprises a plow for engaging the waste, a stripper slidably held adjacent the plow remote from the waste engaging portion of the plow, means actuated by the mandrel after the latter has been freed of the waste for operating the stripper, and means for returning the stripper to its remote position.

PAUL W. LEHMAN.